United States Patent
Mendez

(10) Patent No.: US 9,518,651 B2
(45) Date of Patent: Dec. 13, 2016

(54) WEIGHTED GEARSHIFT KNOB

(71) Applicant: Carlos Joaquin Mendez, Fort Lauderdale, FL (US)

(72) Inventor: Carlos Joaquin Mendez, Fort Lauderdale, FL (US)

( * ) Notice: Subject to any disclaimer, the term of this patent is extended or adjusted under 35 U.S.C. 154(b) by 0 days.

(21) Appl. No.: 14/876,807

(22) Filed: Oct. 6, 2015

(65) Prior Publication Data

US 2016/0097447 A1    Apr. 7, 2016

Related U.S. Application Data

(60) Provisional application No. 62/060,025, filed on Oct. 6, 2014.

(51) Int. Cl.
*G05G 1/06* (2006.01)
*F16H 59/02* (2006.01)

(52) U.S. Cl.
CPC ............ *F16H 59/0278* (2013.01); *G05G 1/06* (2013.01)

(58) Field of Classification Search
CPC .. F16H 59/0278; G05G 1/06; Y10T 74/20732
See application file for complete search history.

(56) References Cited

U.S. PATENT DOCUMENTS

| 3,484,808 | A | 12/1969 | Conterno |
| 3,693,467 | A | 9/1972 | Oehl |
| 5,284,400 | A | 2/1994 | Thomas |
| 5,413,008 | A * | 5/1995 | Brock ............... B60K 20/02 74/18 |
| 5,738,610 | A | 4/1998 | Hung |
| 6,421,881 | B1 | 7/2002 | Shovlin |
| 8,714,050 | B2 * | 5/2014 | Huang ............... F16K 31/00 137/625.4 |
| 2006/0107781 | A1 | 5/2006 | Yao |
| 2007/0137416 | A1 | 6/2007 | Mowzoun |
| 2008/0314186 | A1 * | 12/2008 | Ford ................. B60K 20/04 74/473.23 |
| 2009/0213603 | A1 * | 8/2009 | Lin .................... B60Q 3/024 362/491 |

FOREIGN PATENT DOCUMENTS

| FR | 2910142 A3 * | 6/2008 |
| JP | 59183421 A * | 10/1984 |
| JP | 02085558 A * | 3/1990 |
| JP | 10141481 A * | 5/1998 |
| JP | 2005225244 A * | 8/2005 |

* cited by examiner

*Primary Examiner* — Adam D Rogers
(74) *Attorney, Agent, or Firm* — Calrie Marsh, Esq.; Calrie Marsh, P.A.

(57) ABSTRACT

The present invention is a weighted gearshift knob for mounting to the gearshift shaft of a motor vehicle. The weighted gearshift knob comprises of a cylindrical exterior body with a hollow cylindrical interior for housing a cylindrical counter weight, which weight is secured by a removable screw, and said screw is covered by a cap. The weighted gearshift knob is designed to allow for the addition or removal of the counter weight as desired by a driver in order to achieve optimal performance. This design allows the gearshift knob and its components to be housed in one apparatus, requiring minimal assembly and/or disassembly for mounting or removal from the gearshift shaft.

2 Claims, 6 Drawing Sheets

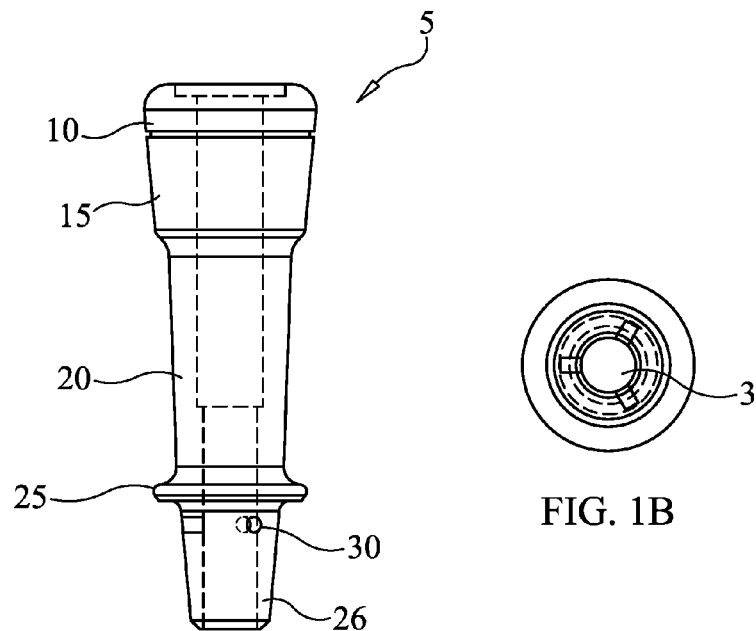
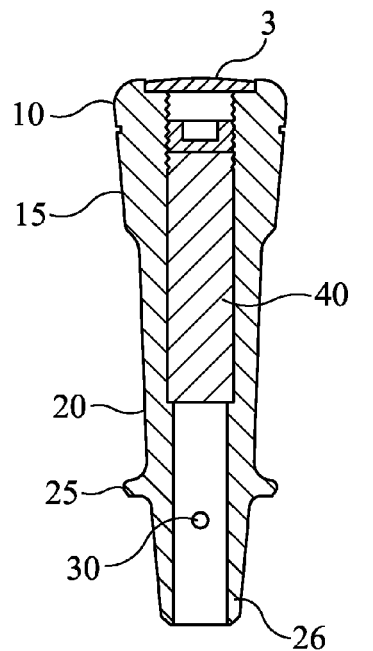
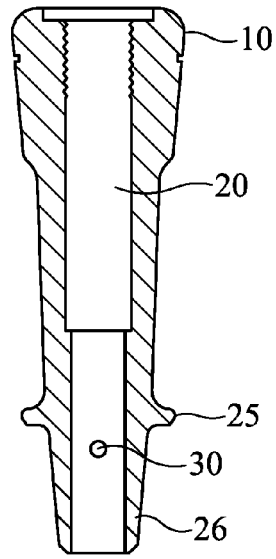
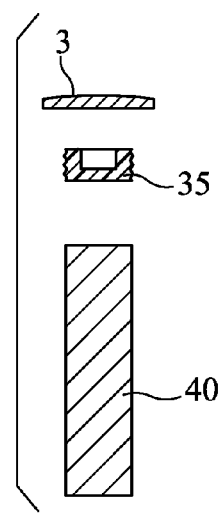
FIG. 1A  FIG. 1B  FIG. 1C  FIG. 1D  FIG. 1E

WEIGHTED GEARSHIFT KNOB

CROSS-REFERENCE TO RELATED APPLICATIONS

This application claims the benefit of U.S. Provisional Application No. 62/060,025 filed on Oct. 6, 2014. The entire disclosure of this prior application is hereby incorporated by reference.

STATEMENT REGARDING FEDERALLY SPONSORED RESEARCH OR DEVELOPMENT

This invention has been created without the sponsorship or funding of any federally sponsored research or development program.

FIELD OF THE INVENTION

The present invention relates generally to a weighted shift knob for motor vehicles.

BACKGROUND

This invention relates to a weighted gearshift knob for motor vehicles. In the racing or sports car enhanced performance industry, where control of a motor vehicle using quick and precise movements of a gearshift is very important, there have been many improvements to the gearshift knob. Some such improvements have been subtle, but able to revolutionize the function and style of sports cars. This present invention may appear subtle, but is one that changes the handle, feel, and a driver's performance experience by adding a removable weight to the gearshift knob and changing the shape and design of the gearshift knob.

In the past inventors have focused on gearshift features such as the connection of the gearshift knob to the gearshift shaft, usually coming up with improved ways of mounting the gearshift knob to the upper end of the gearshift shaft. The focus of these inventions have been to reduce the movement or radial rotation of the knob about the shaft by using attachment techniques or designs such as friction fit, snap on mechanisms, or compression clips. However, these improvements usually require that the gearshift knob have many varying components and intricate assembly utilizing tools. Further, these improvements are subject to loosening of the knob attachment over time due to use or due to quick movements applied by a driver. This loosening of the gearshift knob attachment results in increased noise in the gearshift as was as reduced control and performance.

SUMMARY OF THE INVENTION

The present invention is a gearshift knob for mounting to the gearshift shaft of a motor vehicle. This invention aims to allow for the addition or removal of a counter weight through the upper portion of the gearshift knob. This gearshift knob has a cylindrical shape with a hollow interior suited for the insertion of a cylindrical weight, which weight is then secured by a removable screw, and the screw is covered by a cap. This design allows the gearshift knob and its components to be housed in one apparatus, requiring minimal assembly and/or disassembly for mounting or removal from the gearshift shaft. This gearshift knob is mounted to the gearshift shaft as one component unit and without the use of any fasteners, clips, or other attachment mechanisms for assembly. This gearshift knob is easily and securely attached to the gearshift shaft with set screws. Additionally, this gearshift knob does not require disassembly prior to removal from the gearshift shaft.

A key component of this present invention is the cylindrical weight inserted into the hollow housing that comprises the gearshift knob. This cylindrical weight is specially crafted and sized to fit snugly within the gearshift knob body in order to optimize the handle of the gearshift during racing or street driving. This snug fit is designed to maintain rigid positioning of the cylindrical weight and reduce or eliminate slippage during use. The weight acts as a counterweight during shifting and allows for weight adjustment to fit a driver's style and driving preference. Additionally, the set screws which secure the gearshift knob to the gear shaft helps to eliminate or significantly reduce the de of rotation of the knob about the shaft during intense driving and gear shifting. The stability of the attachment of the gearshift knob to the shaft via the set screws also provides the added function of eliminating the accidental slipping or separation of the knob from the shaft. In the present invention, the addition of the cylindrical weight allows the driver to have more precise shifting of gears, while the added height of the knob allows the driver to keep his hand closer to the steering wheel while shifting through gears. The design of the gearshift knob provides the driver with the assurance that the gearshift will remain securely attached to the shaft and be able to withstand the myriad and multiple quick movements under intense driving conditions.

BRIEF DESCRIPTION OF THE DRAWINGS

FIG. 1A is a front view of the assembled components of the present invention.

FIG. 1B is a top view of the cap component of the present invention.

FIG. 1C is a cross sectional view of the assembled components of the present invention.

FIG. 1D is a cross sectional view of the unassembled components of the present invention.

FIG. 1E is a cross section sectional view of the components of the invention as they appear standing alone and unassembled.

DESCRIPTION OF THE INVENTION

Figure 2:
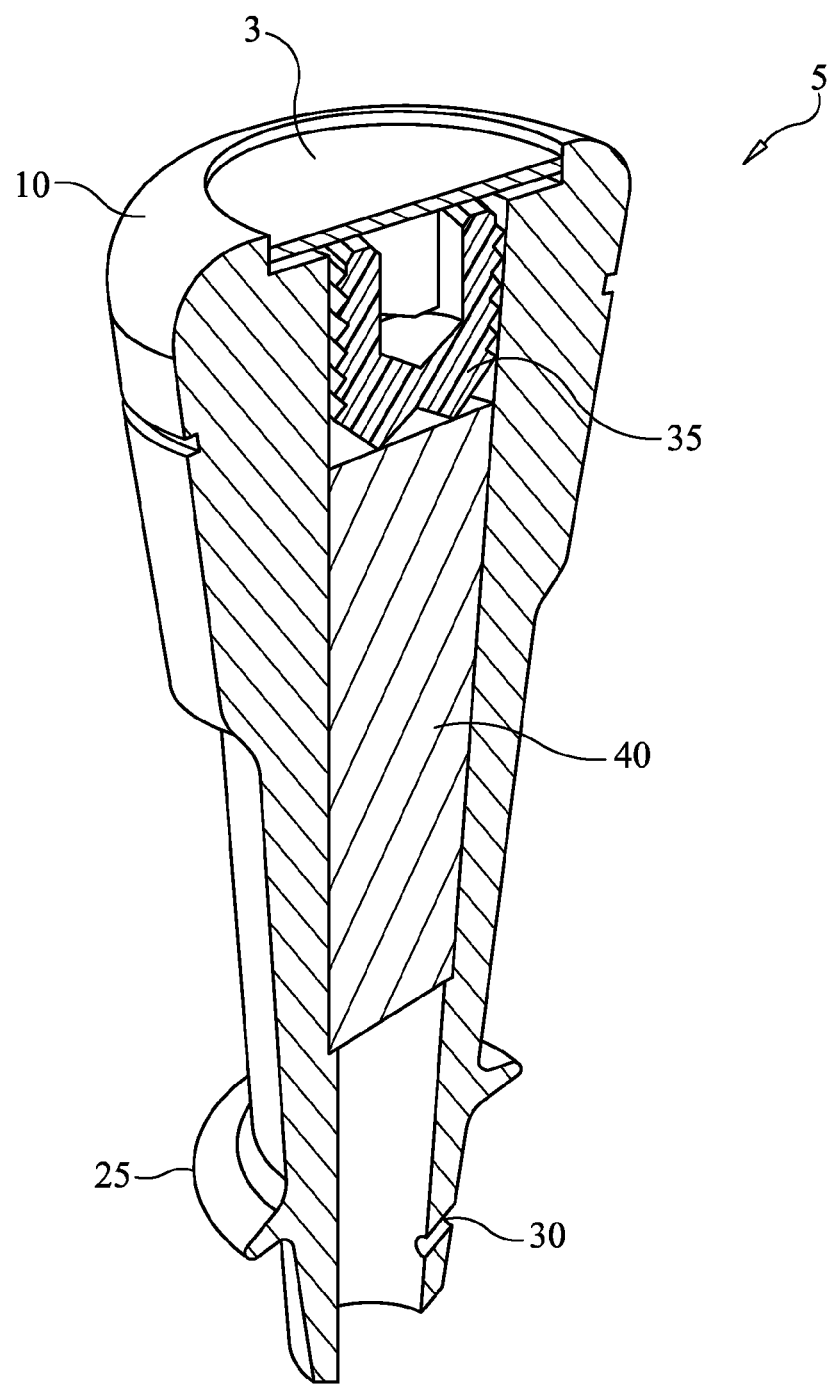
FIG. 2 is a three dimensional cross sectional view of the components of the present invention completely assembled.

Before the subject invention is described further, it is to be understood that the invention is not limited to the particular embodiments of the invention described below, as variations of the particular embodiments may be made and still fall within the scope of the invention. It is also to be understood that the terminology employed is for the purpose of describing particular embodiments, and is not intended to be limiting.

The details of one or more embodiments of the invention are set forth in the accompanying drawings and the description below. Other features, objects, and advantages of the invention will be apparent from the description and drawings, and from the claims. In the following description, numerous specific details are set forth to provide a thorough understanding of the embodiments. One skilled in the art to which this invention belongs will recognize, however, that the techniques described can be practiced without one or more of the specific details, or with other methods, components, materials, etc. In other instances, well known structures, materials or operations are not shown or described in detail to avoid obscuring certain aspects.

In this specification, the singular forms "a," "an" and "the" include plural reference unless the context clearly dictates otherwise. Unless defined otherwise, all technical and scientific terms used herein have the same meaning as commonly understood to one of ordinary skill in the art to which this invention belongs.

The present invention, as shown in FIG. 1 comprises of a cylindrical shaped gearshift knob exterior body 5 with a hollow cylindrical interior 20 for housing a cylindrical weight 40, which weight is secured by a removable screw 35, and said screw is covered by a cap 3 as shown in FIG. 1B. The gearshift knob 5 comprises a first segment 10 located at the top of the gearshift 5 and has a convex mushroom or rounded shape as with a hollow interior for housing the cap 3 and a portion of the removable set screw 35. This first segment 10 is designed to facilitate easy handling and gripping by the user as it fits comfortably in the palm of the user's hand. As shown in FIG. 1C, the first segment 10 is rounded upward towards the cap 3 and is indented where it contiguously connects to a second segment 15 which is conical in shape with a hollow interior for partially housing the removable set screw 35. The second segment 15 is contiguously connected to a third segment 20 which is cylindrical in shape and serves to house the cylindrical weight 40. This third segment 20 is designed to rigidly house the cylindrical weight 40 to reduce or eliminate unwanted movement or sliding during use of the gear shift knob 5. The third segment 20 is contiguously connected to a fourth segment 25 which has a saucer like or elliptical shaped lip that facilitates the mounting of the gearshift knob 5 onto the shaft of a gearshift. The fourth segment 25 is contiguously connected to a fifth segment 26 which is cylindrical in shape and serves as the point of attachment of the gear shift knob 5 to the shaft of a gearshift. The fourth segment 25 is the lip and the fifth segment 26 is the stem of the point of attachment of the gearshift knob 5 to the shaft of a gearshift. The fifth segment 26 has three set screw holes 30 (only one is pictured in FIG. 1) whereby set screws 32 are used to securely fasten the gearshift knob 5 to the shaft of a gearshift.

FIGS. 1C, 1D, and 1E are cross sectional views of the gearshift knob S and its components. FIG. 1C shows the cross section of the gearshift knob 5 with the cylindrical weight 40, the set screw 35, and the cap 3 in place. FIG. 1D shows the cross section of the gearshift knob 5 without the cylindrical weight 40, the set screw 35, and the cap 3 in place. FIG. 1D also shows the hollow interior of the third segment 20. FIGS. 1C and 1D also illustrate the screw grooves 50 (further illustrated in FIG. 3) along the hollow interior of the first and second segments 10 and 15, which screw grooves facilitate the secure attachment of the set screw 35. FIG. 1E shows the cap 3, set screw 35, and the cylindrical weight 40 unassembled. FIG. 2, shows a cross sectional view of the assembled components of the gearshift knob 5, whereby the cylindrical weight 40 fits rigidly within the hollow interior of the third segment 20 of the gearshift knob body 5. In the preferred embodiment (as shown in FIG. 2), the cylindrical weight 40 consists of steel and weighs 100 grams, but may be crafted using other metal alloys or like materials of varying weights in other embodiments. In the preferred embodiment (as shown in FIG. 2), the gearshift knob body 5 consists of 100% DELRIN® for high stiffness, low friction, and increased dimensional stability. However, in other embodiments of the invention, the gearshift knob body 5 may be made of other suitable material meeting the requirements for stiffness, low friction, low heat absorption and dimensional stability. In the preferred embodiment, the removable set screw 35 is made of durable plastic and requires a tool for fastening to ensure that the cylindrical weight 40 is securely kept in place with little or no movement within the gearshift knob body 5. In other embodiments of the invention, the removable screw 35 may be made of other durable material designed to achieve the desired results in its function as a component of the present invention. The cap 3 that is placed over the removable screw 35 may be made of durable material of such a degree that it would withstand bending, warping, cracking, or other deterioration under the intense pressure conditions encountered during racing or street driving.

Figure 3:
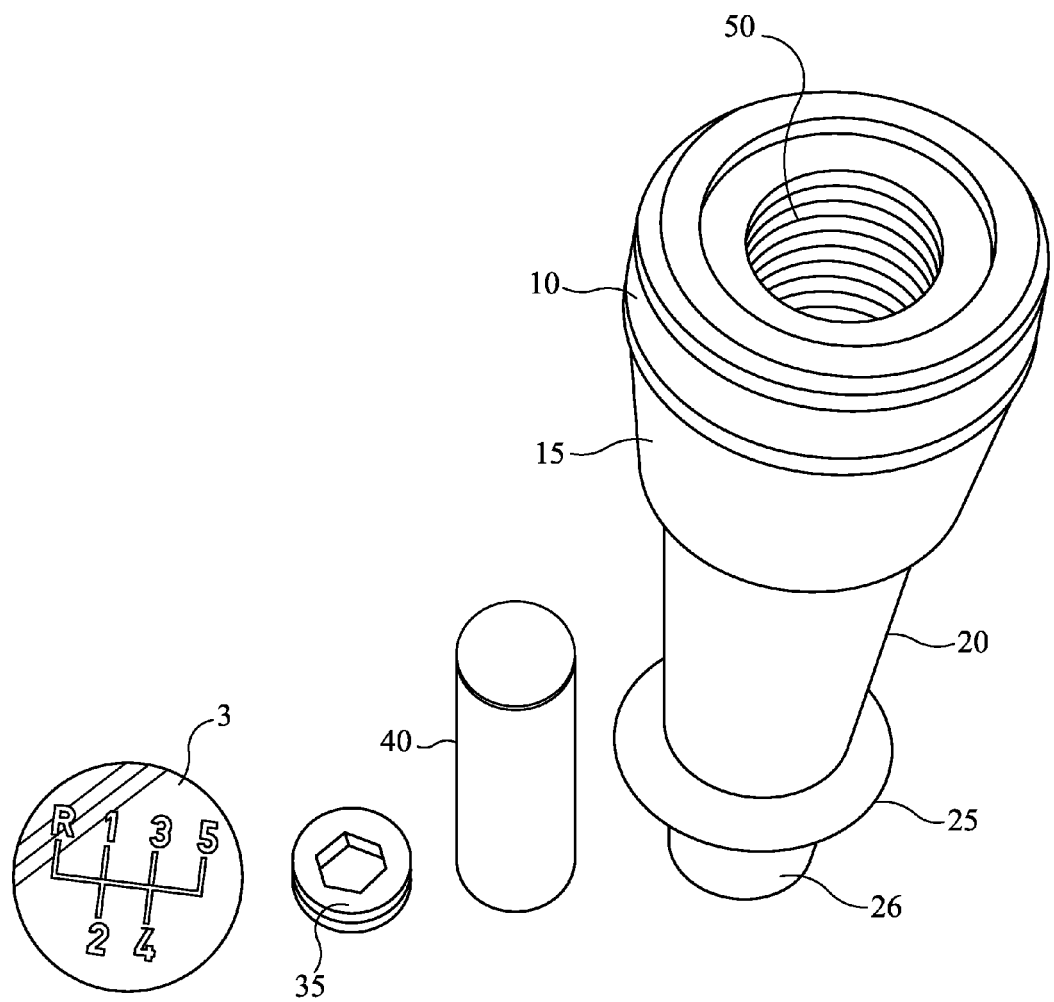
FIG. 3 is a top side view of each component of the present invention.
Figure 4:
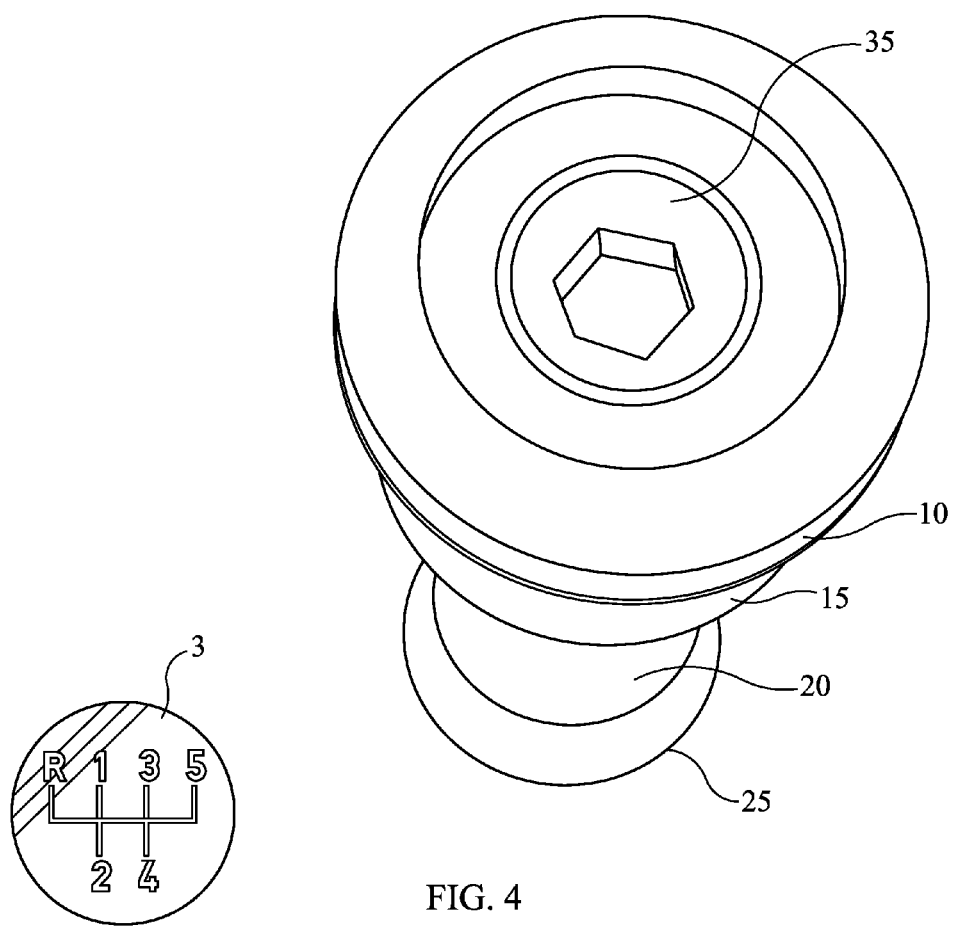
FIG. 4 is a top side view of the present invention as assembled without the cap.
Figure 5:
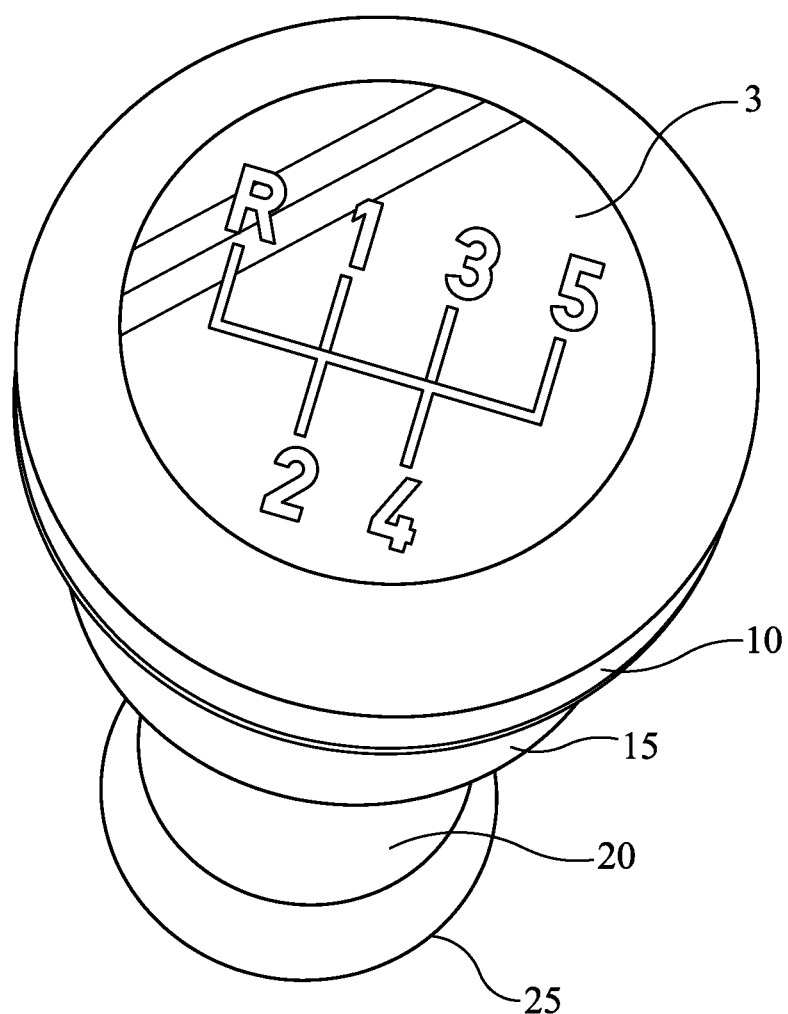
FIG. 5 is a top side view of the present invention as completely assembled.
Figure 6:
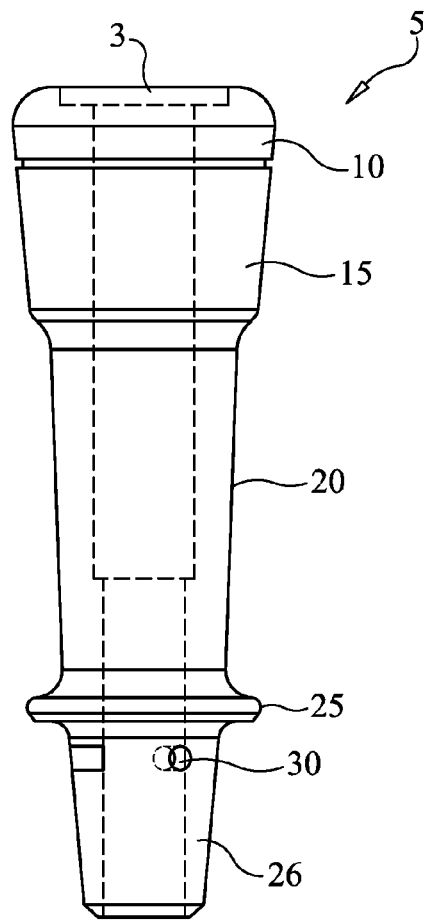
FIG. 6 is a front view of the exterior body of the present invention.
Figure 7:
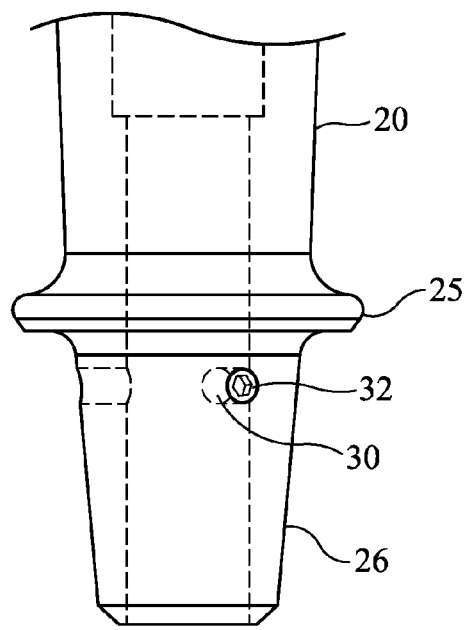
FIG. 7 is a close up view of the point of attachment for mounting the present invention to a gearshift shaft.

FIG. 3 shows the individual components of the present invention from a top view, including the screw threads 50 on the hollowed interior of the first segment 10 and second segments 15 of the gearshift knob 5. FIG. 3 also provides a top view of the cap 3, the set screw 35, and the cylindrical weight 40 unassembled. FIG. 4 is a top view of the assembled gearshift knob 5 and the cap 3, where the cylindrical weight 40 has been inserted into the third segment 20 and the removable screw 35 has been securely fastened with a tool. FIG. 5, shows the gearshift knob 5 completely assembled with the cap 3, for mounting on a gearshift shaft by way of 3 set screws 32 (not pictured). FIG. 6 shows a frontview of the gearshift knob body 5, displaying the convex mushroom or rounded shape of the first segment 10 and the ridges which separate the segments of the interior housing. FIG. 7 is a close up of the point of attachment 26 for mounting the gearshift knob 5 onto the shaft of a gearshift, displaying one of the three screw holes 30 used for attachment via set screws 32.

The preferred embodiment of this invention is adapted for use with BMW high performance race cars and BMW sports cars available on the market. However, this invention may be adaptable for use with other make and model cars. In other embodiments of this invention, the weight may be inserted into the gearshift knob body for quick shifting or removed to achieve the feeling of a lighter weight knob. Thus, the gearshift knob 5 without the steel weight 40 may be sufficient depending on a driver's style and preference.

As various changes may be made in the above-described subject matter without departing from the scope and the spirit of the invention, it is intended that all subject matter contained in the above description, or shown in the accompanying drawings, will be interpreted as descriptive and illustrative, and not in a limiting sense.

It is to be understood, that the subject invention described herein is not limited to the particular embodiments of the invention described herein, as variations of the particular embodiments may be made and still fall within the scope of the invention as described herein. It is also to be understood that the terminology employed is for the purpose of describing particular embodiments, and is not intended to be limiting.

As various changes can be made in the above-described subject matter without departing from the scope and the spirit of the invention, it is intended that all subject matter contained in the above description, shown in the accompanying drawings, or defined in the appended claims will be interpreted as descriptive and illustrative, and not in a limiting sense. Many modifications and variations of the present invention are possible in light of the above teachings. It is therefore to be understood that within the scope of the appended claims, the invention may be practiced otherwise than as specifically described.

EQUIVALENTS

Those skilled in the art will recognize, or be able to ascertain using no more than routine experimentation, many equivalents to the specific embodiments of the invention described herein. Such equivalents are intended to be encompassed by the claims.

What is claimed is:
1. A weighted gearshift knob comprising:
a removable cap;
a removable set screw;
a removable cylindrical weight;
a first segment that begins at an indentation and is rounded upwards to the cap, with a hollow interior for securely inserting the cap;
a second segment, which begins at the indentation of the first segment and contiguously connects to the first segment, having a conical shape with a hollow interior with screw grooves for securely fastening the removable set screw;
a third segment, contiguously connected to the second segment having a cylindrical shape with a hollow interior for rigidly housing the removable cylindrical weight;
a fourth segment, contiguously connected to the third segment, having an elliptical lip for facilitating attachment of the gearshift knob to a gearshift shaft; and
a fifth segment, contiguously connected to the fourth segment, having a cylindrical shape and having three set screw holes for securely mounting the gearshift knob onto the gearshift shalt with three set screws.

2. A weighted gearshift knob as in claim 1, wherein the body of the gearshift knob is made of 100% DELRIN®, the cylindrical weight consists of steel weighing 100 grams.

* * * * *